United States Patent
Gregg et al.

[11] Patent Number: 5,840,443
[45] Date of Patent: Nov. 24, 1998

[54] REDOX POLYMER ELECTRODES FOR ADVANCED BATTERIES

[75] Inventors: Brian A. Gregg; A. Michael Taylor, both of Golden, Colo.

[73] Assignee: Midwest Research Institute, Kansas City, Mo.

[21] Appl. No.: 509,560

[22] Filed: Jul. 31, 1995

[51] Int. Cl.⁶ .................................................. H01M 4/02
[52] U.S. Cl. ...................... 429/212; 429/192; 429/194; 429/213; 429/216; 429/218; 429/221; 252/62.2
[58] Field of Search ..................................... 429/194, 192, 429/213, 191, 216, 218, 221; 252/62.2, 182.1

[56] References Cited

U.S. PATENT DOCUMENTS

| | | | |
|---|---|---|---|
| 2,831,045 | 4/1958 | Harding . | |
| 4,461,691 | 7/1984 | Frank . | |
| 4,535,039 | 8/1985 | Naarmann et al. | 429/213 |
| 4,605,603 | 8/1986 | Kanda et al. | 429/59 |
| 4,609,600 | 9/1986 | Heinze et al. | 429/197 |
| 4,728,589 | 3/1988 | MacDiarmid et al. . | |
| 4,801,512 | 1/1989 | MacDiarmid et al. . | |

OTHER PUBLICATIONS

Wrighton, M.S., Science 1986, 231–232. (Month N/A).
Matsuda, Y.; Tanaka, K.; Okada, M.; Takasu, Y.; Morita, M.; Matsumura–Inoue, T.J. Appl. Electrochem. 1988, 18, 909–914. (Month N/A).
Assink, R.A.; Arnold, C.J. in 26th Intersociety Energy Conversion Engineering Conference; IEEE; Boston, Mass. 1991; pp. 458–462. (Month N/A).
Miller, L.L.; Van de Mark, M.R. J. Am. Chem. Soc. 1978, 100, 639 (Month N/A).
Oyama, N.; Anson, F.C. J. Am. Chem. Soc. 1979, 101, 739. (Month N/A).
Scrosati, B., J. Electrochem. Soc. 1992, 139, 2776–2781. (Month N/A).
Abruna, (Coord. Chem. Rev. 1988, 86, 135–189). (Month N/A).
Gregg, B.A.; Heller, A. J. Phys. Chem. 1991, 95, 5970–5975. (Month N/A).
Gregg, B.A.; Heller, A. J. Phys. Chem. 1991, 95, 5976–5980. (Month N/A).

Primary Examiner—Maria Nuzzolillo
Attorney, Agent, or Firm—Edna M. O'Connor; Ruth Eure

[57] ABSTRACT

Advanced batteries having a long cycle lifetime are provided. More specifically, the present invention relates to electrodes made from redox polymer films and batteries in which either the positive electrode, the negative electrode, or both, comprise redox polymers. Suitable redox polymers for this purpose include pyridyl or polypyridyl complexes of transition metals like iron, ruthenium, osmium, chromium, tungsten and nickel; porphyrins (either free base or metallo derivatives); phthalocyanines (either free base or metallo derivatives); metal complexes of cyclams, such as tetraazacyclotetradecane; metal complexes of crown ethers and metallocenes such as ferrocene, cobaltocene and ruthenocene.

12 Claims, 2 Drawing Sheets

Cathode Material

3 PF₆⁻

Charged

Anode Material

PF₆⁻

Discharged

2 PF₆⁻

2 PF₆⁻

REDOX POLYMER ELECTRODES FOR ADVANCED BATTERIES

CONTRACTUAL ORIGIN OF THE INVENTION

The United States Government has rights in this invention pursuant to Contract DE-AC36-83CH10093 between the U.S. Department of Energy and the Midwest Research Institute.

FIELD OF THE INVENTION

This invention relates to the field of advanced batteries and, in particular, to batteries having a long cycle lifetime. More specifically, the present invention relates to electrodes made from redox polymer films and batteries in which either the positive electrode, the negative electrode, or both, are made from redox polymer electrodes.

BACKGROUND OF THE INVENTION

Batteries employing conducting polymer electrodes have been previously described, for example, in U.S. Pat. Nos. 4,801,512 and 4,728,589, both to MacDiarmid, et al. In these patents, the electrochemical reduction of the oxidized conjugated polymers effects an uncharging of the polymer by a mechanism in which the positively charged carbon atoms along the polymer backbone chain become electrochemically reduced to an electrically neutral or less positively charged state, which results in the anionic counterions being released from the polymer. Similarly, the electrochemical oxidation of the reduced conjugated polymers effects an uncharging of the polymer by a mechanism in which the negatively charged carbon atoms along the polymer backbone chain become electrochemically oxidized to an electrically neutral or less negatively charged state, which results in the cationic counterions being released from the polymer.

The secondary batteries of both MacDiarmid et al. patents employ a conjugated polymer as the electrode-active material of one or both of the electrodes, and utilize various electrochemical charging and electrochemical uncharging reactions described above as their charging and discharging mechanisms. The electrolyte component of such secondary batteries comprises a compound which is ionizable into one or more ionic counterion species suitable for effecting the appropriate electrochemical charging reactions, i.e., an anionic counterion species for effecting charging of an electrode-active conjugated polymer to a higher oxidation state, and/or a cationic counterion species for effecting charging of an electrode-active conjugated polymer to a lower oxidation state. These secondary batteries may be either initially assembled in a charged state; or initially assembled in an uncharged state, and subsequently converted in situ to such charged state by means of the above described electrochemical charging or electrochemical uncharging reactions.

U.S. Pat. No. 4,461,691 to Frank pertains to conducting polymers for the stabilization of semiconductor photoelectrodes. This patent makes the distinction between conducting polymers which are defined as being electrically conductive, and redox polymers which are defined as being electroactive, as described by Wrighton, M. S., *Science* 1986, 231, 32. Thus, apparently the distinction between redox polymers and conducting polymers is already recognized. For purposes of this patent application, "redox polymer" is defined as a polymer of redox active molecules in which the polymer backbone is not electroactive. For example: ferrocene is a common redox active molecule; vinyl ferrocene is a commercially available monomeric, but polymerizable, redox active molecule; and poly(vinyl ferrocene) is the redox polymer obtained upon polymerization of vinyl ferrocene. This contrasts to "conjugated (or conducting) polymer" which is defined herein and in the literature as having conjugated unsaturation along its main backbone. This definition, or a close variant, is found throughout the patents and publications discussed herein except those dealing with polyacetylene, which is a specific example of a conjugated polymer. The conductivity in these materials results from the conjugated backbone, specifically, electrons are transferred through the material along the polymer backbone. An electrode made from a conjugated polymer can be considered to be a single electronic moiety by virtue of the electronic delocalization resulting from the conjugation. Such polymers exhibit metal-like conductivity and are often referred to as "organic metals".

Monomeric transition metal redox complexes, one type of redox active molecule, have been proposed for use in flow-type redox batteries, as reported by Matsuda, Y.; Tanaka, K.; Okada, M.; Takasu, Y.; Morita, M.; Matsumura-Inoue, T. *J. Appl. Electrochem.* 1988, 18, 909–914. In such batteries the redox complexes are dissolved in solution and must diffuse to the electrodes to undergo oxidation or reduction. The oxidized and reduced complexes must be contained in separate compartments to prevent them from self-discharging in solution, thus a semipermeable separator is required between the anode and the cathode compartments. Apart from the plumbing problems that are common to all flow cells, such systems can suffer from a continuous loss of capacity as a result of seepage across the separator, as reported by Assink, R. A.; Arnold, C. J. in 26th *Intersociety Energy Conversion Engineering Conference;* IEEE: Boston, Mass., 1991; pp 458–462. Semipermeable separators are required in all cells containing mobile electroactive species to prevent self-discharge.

Electrodes modified with redox polymers were reported by Miller, L. L.; Van de Mark, M. R. *J. Am. Chem. Soc.* 1978, 100, 639. These first materials were based on organic components such as quinones and were not stable to prolonged redox cycling. A report of a redox polymer based on a transition metal complex was Oyama, N.; Anson, F. C. *J. Am. Chem. Soc.* 1979, 101, 739. Many such complexes are very stable towards electron transfer reactions and have been employed primarily in electrocatalytic applications, such as biosensors, and for the stabilization of semiconductor electrode surfaces. See, for example, Abruna, *Coord. Chem. Rev.* 1988, 86, 135–189; Wrighton, M. S. *Science* 1986, 231, 32; Gregg, B. A.; Heller, A. *J. Phys. Chem.* 1991, 95, 5970–5975; Gregg, B. A.; Heller, A. *J. Phys. Chem.* 1991, 95, 5976–5980. In these applications, the capability of redox polymers to mediate electron transfer between the electrode and species in solution has been utilized.

A number of transition metal complexes spanning a large range of electrochemical potentials have been incorporated into such polymers, as reported by Abruna, supra. It is known that in electrocatalytic applications such films can pass many thousands of electrons per complex, which is formally equivalent to an oxidation-reduction cycle, with no noticeable degradation. See, for example, Abruna, supra; Wrighton, supra, and Gregg (5976).

Lithium concentration cells, also know as "rocking chair batteries" have a lithium storing electrode and a lithium source electrode. The cell is cycled by shuttling lithium ions from one electrode to the other. The lithium storing electrode must be capable of storing large quantities of lithium ions in its lattice when reduced and releasing them when oxidized as described by Scrosati, B. in *J. Electrochem. Soc.* 1992, 139, 2776–2781.

Electrochemical reversibility of the processes occurring during charge and discharge cycles, and the long-term integrity of the cell components determine the utility and cycle lifetime of advanced secondary batteries. Advanced batteries for use with solar, wind or hybrid energy systems require low, or zero, maintenance and long cycle lives. These applications require batteries capable of a charge-discharge cycle once a day for many years, i.e., a cycle life of at least 2000–3000 cycles. Such batteries also contribute to the more efficient use of conventional power sources, for example, in load leveling applications for existing power plants. The ability to incrementally add or remove capacity makes battery systems more flexible than other common forms of storage such as pumped hydroelectric or compressed air that require large capital investments and long lead times.

No one has heretofore demonstrated the use of the charge storage capability of redox polymers in battery applications. In the present invention there are no electroactive species in solution, thus electron transfer does not take place between the redox polymer and solution species. Electron transfer takes place only between the electrode and the redox polymer film, resulting in the charging or discharging of the battery.

In contrast to the conjugated polymers, the present invention involves redox polymers, which specifically do not have conjugated unsaturation along the polymer backbone. Redox polymers consist of separate, independent moieties that can be oxidized or reduced, while preserving their individual electronic character. An electrode made from a redox polymer can be considered to be an array of individual electronic units rather than a single electronic unit. Conductivity does not occur along the polymer backbone in these materials but rather by electron hopping between the discrete electronic units. The polymer backbone is an electrically inert chemical moiety whose only function is to physically bind the redox complexes to each other. Therefore, similar electrical properties can be obtained with chemically different backbones, as demonstrated hereinafter. This contrasts to the conducting polymers where the electrical properties are predominantly determined by the nature of the (conjugated) backbone because the conductivity occurs along this backbone. The electrical properties of a redox polymer, on the other hand, are only slightly perturbed from those of the corresponding monomers, i.e., the redox complexes. In contrast, there is a dramatic difference in the electrical properties of the conducting polymers and their corresponding monomers. For example, acetylene is an electrically insulating gas and aniline is an electrically insulating liquid, but when oxidatively polymerized, the resulting solid polyacetylene and polyaniline are highly conducting, with conductivities approaching those of inorganic metals like copper.

SUMMARY OF THE INVENTION

The present invention describes the use of redox polymer films as electrodes in advanced secondary (rechargeable) batteries. This has not been accomplished heretofore. As this battery is cycled, the active redox complex changes oxidation state with a corresponding adjustment in its number of counterions; no chemical bonds are formed or broken as occur in the majority of existing battery types. Consequently, the battery of the present invention prevents unwanted side reactions which limit the cycle lifetime of the battery. The counterions in solution play only an electrostatic role and do not have specific interactions with the redox polymer. Thus a variety of counterion species can be used, in contrast to the need for a specific counterion, such as lithium in the rocking chair batteries described above. The redox polymer batteries of the present invention were designed specifically for long cycle lifetime, rather than high energy density or power density. The redox polymer is stably bound to the electrode so the redox complex is not mobile. The solution contains only electro-inactive counterions allowing both anode and cathode to be in the same compartment, thus eliminating the need for a semipermeable separator. Redox polymers can be used as either the anode, the cathode, or as both electrodes. Redox polymers suitable for use in the present invention comprise a large class of materials that cover a range of electrochemical potentials, thus the battery voltage can be high but still be chosen to be in the range where the electrodes will not react irreversibly with solvents and electrolytes. Without being bound by any particular theory, thermodynamic stability of the solvent and the electrode material is believed to contribute to long cycle life.

It is an object of the present invention to offer a number of advantages over existing battery systems. Redox complexes are very stable, exhibit rapid electron transfer kinetics, and no chemical bonds are altered during the electron transfer process. Therefore, redox polymer film electrodes can be discharged and recharged many times without degradation. Irreversible morphological changes typically occur in solid electrodes, which compromise their usefulness. No such changes occur in the solid redox polymer electrodes of the present invention.

It is a further object of the present invention to eliminate the need for a semipermeable separator which is one of the major problems commonly associated with redox and liquid cathode batteries. Since the cell contains no diffusing electroactive reagents, it requires only physical separation of the two electrodes, thus avoiding this common source of problems with advanced batteries.

It is a further object of the present invention to provide an ambient temperature cell, thus the enclosure design is much simpler than in high temperature cells.

It is a further object of the present invention to provide a redox polymer electrode which exhibit extremely long cycle life, which is a desirable characteristic in secondary batteries. Long cycle life is a critical feature in stationary battery applications. Such applications include load leveling, stand alone power systems such as wind or solar electric systems, and emergency back up power supplies in any setting. Batteries based on redox polymer electrodes could also find use in a range of consumer electronic devices, including portable computing and communications equipment. The durable nature of redox polymer electrodes also makes them well suited for use in vehicles.

DETAILED DESCRIPTION OF THE INVENTION

Redox polymer films can be prepared on a wide variety of electrode surfaces including stainless steel, flexible indiumtin-oxide (ITO)-coated Mylar electrodes and high surface area electrodes such as carbon cloth, carbon felt, and carbon foam. A typical example of a redox active molecule is Ru(II)bpy$_3$CL$^-_2$, also known as ruthenium(II) tris (bipyridine) dichloride. In this case the ruthenium is in its 2+ oxidation state and therefore requires 2 chloride counterions to be electroneutral. It can undergo either oxidation to Ru(III)bpy$_3$Cl$_3^-$ with addition of one more counterion (chloride in this case), or reduction to Ru(I)bpy$_3$Cl$^-$ with loss of one counterion. Upon oxidation or reduction, the redox active molecule simply changes oxidation state with a corresponding adjustment in its number of counterions; no covalent bonds are formed or broken and so there is little opportunity for unwanted or side reactions to take place. For this reason, such redox active molecules may undergo multiple oxidation/reduction cycles with very little degradation.

The charge capacity of redox polymer films on planar substrates is low. The processes of the present invention can be used to polymerize or to deposit redox polymers onto high surface area substrates such as carbon felt, carbon foam, carbon cloth or graphite powder electrodes. (See Example 3.) Such substrates can have an actual surface area more than 1000 times greater than the geometric surface area. This increases the capacity of the electrode significantly.

The process occurring in a cell with both anode and cathode made from the same redox polymer, such as poly-(ruthenium trisvinylbipyridine), is

Figure 2:
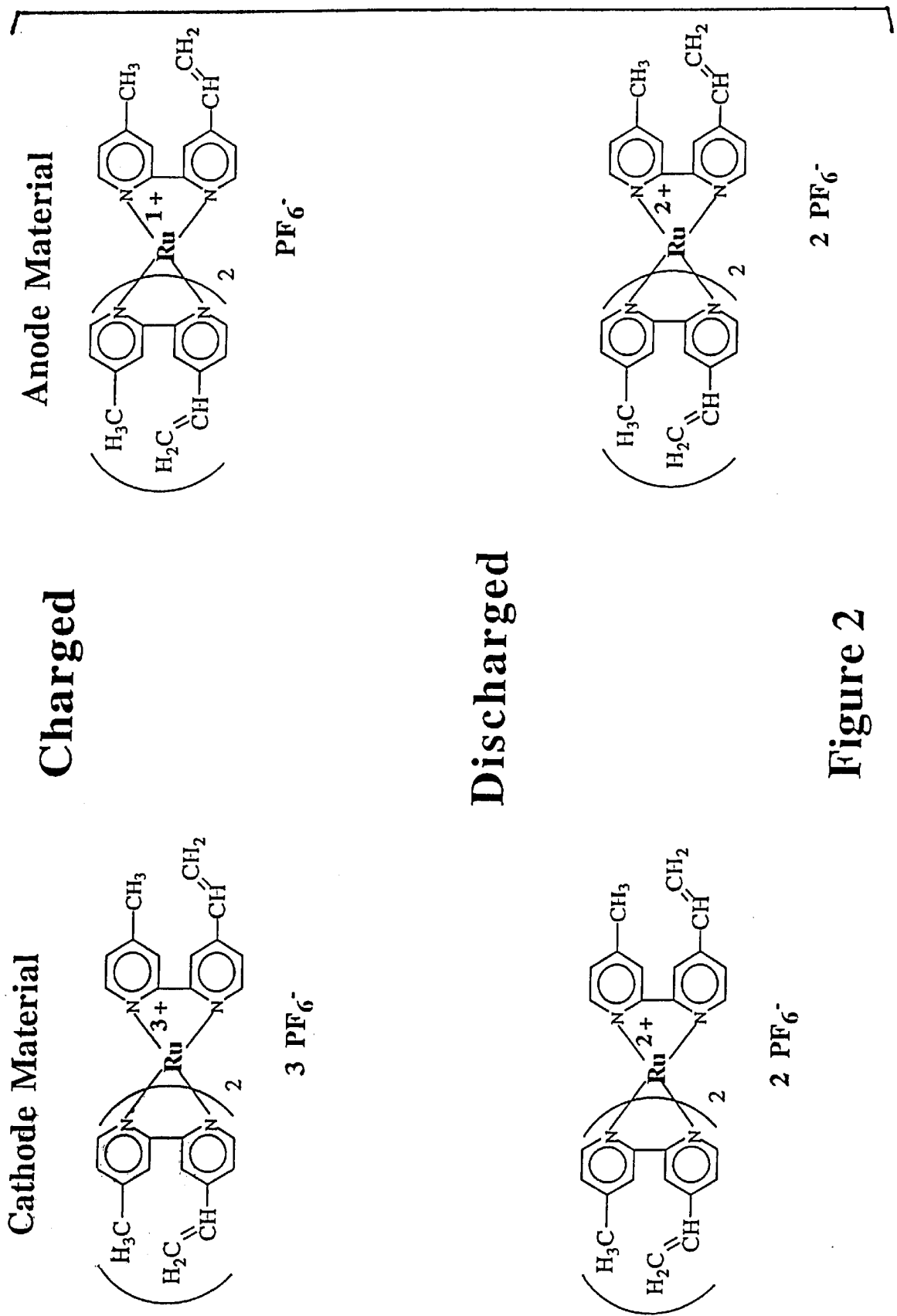
FIG. 2 is a molecular representation of the migration of charge in the cathode and anode material of the electrode of the present invention.

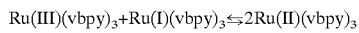

where vbpy is vinylbipyridine and the left hand side represents the battery in its charged state and the right hand side represents the battery in its discharged state. In the charged state, positive charge is reversibly stored in the Ru(III)(vbpy)$_3$ and negative charge is reversibly stored in the Ru(I)(vbpy)$_3$. See FIG. 2 for a graphic representation of this charge transfer mechanism.

Figure 1:
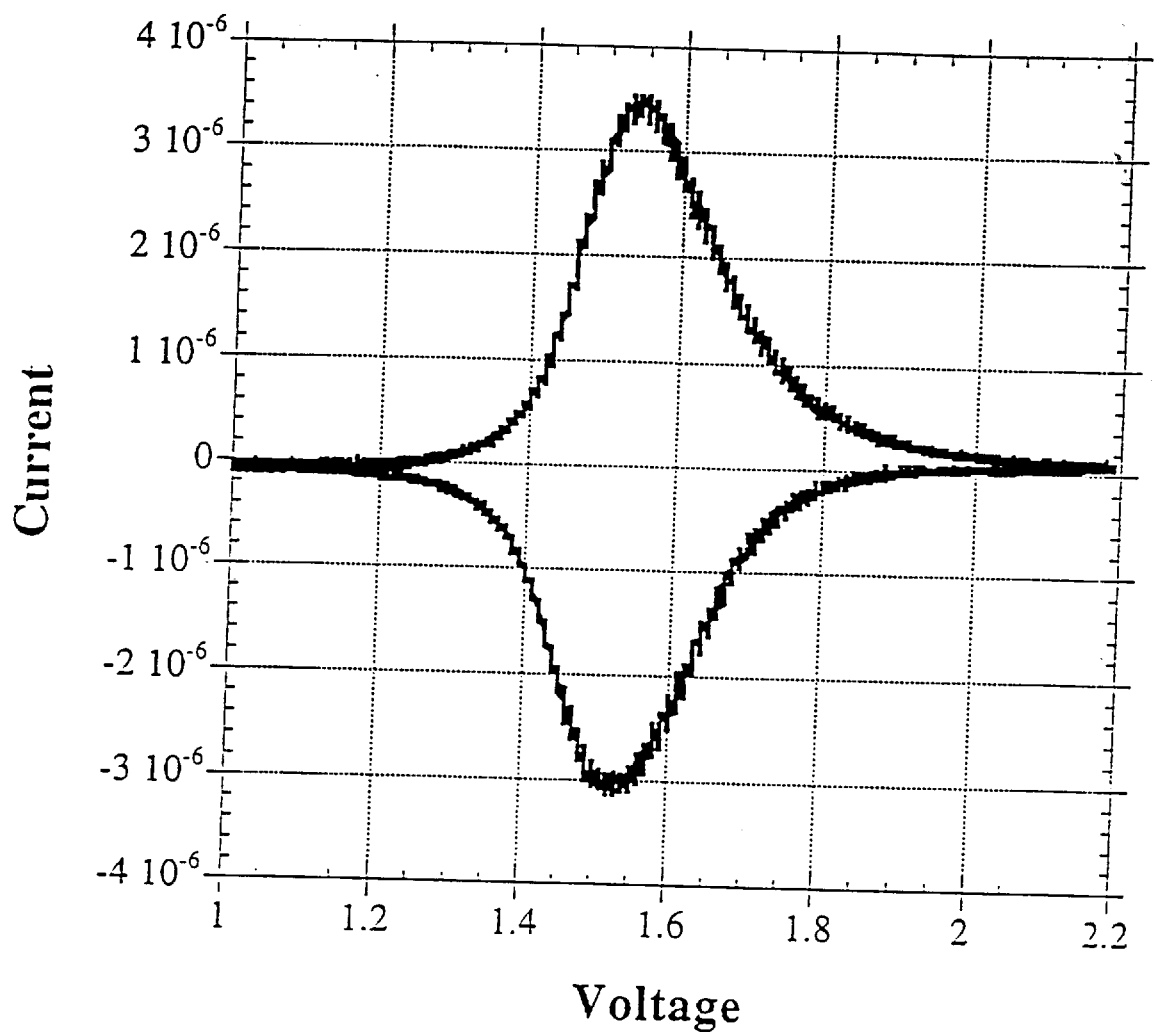
FIG. 1 is a Cyclic Voltammogram showing the current vs. voltage curve of the transition between Ruthenium (II) and Ruthenium (III) in an electrode film of poly(tris-vinylbipyridine)ruthenium.

The reversibility of the change in oxidation state of this configuration can be seen in the voltammogram of FIG. 1. As the voltage potential is scanned positive of about 1.2 V the poly-tris(vinylpyridine)ruthenium(II) begins to get oxidized to the ruthenium(III) derivative. The maximum of the current occurs near the standard potential of the complex (ca. 1.53 V) where the Ru(II) and Ru(III) concentrations are equal. Positive of about 2.0 V the polymer is entirely oxidized (that is, in the Ru(III) state); the current returns to 0 because there is nothing further to oxidize. On the reverse scan, the Ru(III) complex is reduced back to the Ru(II) state. The area underneath one scan, divided by the scan rate, equals the charge storage capacity of the electrode.

A redox polymer consists of a redox complex and an electrically inactive moiety that binds the complexes together. The two components may derive from the same starting material, such as in the electropolymerization of ruthenium trisvinylbipyridine to form poly-(ruthenium trisvinylbipyridine), or they may be originally separate materials, such as in the polymerization of tetra(4-aminophenyl)porphyrin with a diepoxide to form an epoxy polymer. Examples of both approaches are given below. A large variety of redox polymers can be made by varying the redox complexes and the binding moiety.

The following redox complexes are among those suitable for use in the present invention:

Pyridyl or polypyridyl complexes of transition metals like iron, ruthenium, osmium, chromium, tungsten and nickel. Specific examples of this class include ruthenium trisvinyl-bipyridine and osmium bisbipyridine dichloride Porphyrins (either free base or metallo derivatives)

Phthalocycanines (either free base or metallo derivatives)

Metal complexes of cyclams, such as tetraazacyclotet-radecane

Metal complexes of crown ethers

Metallocenes such as ferrocene, cobaltocene and ruthenocene.

One preferred embodiment of the present invention involves the electropolymerization of ruthenium trisvinyl-bipyridine onto a glassy carbon or platinum electrode resulting in a thin film of poly(trisvinylbipyridine)ruthenium(II) coating the electrode. Two of these electrodes can then be used as a battery, one as the anode when it is reduced from the ruthenium(II) to the ruthenium (I) state and the other as the cathode when it is oxidized from the ruthenium(II) to the ruthenium (III) state.

Another preferred embodiment of the present invention involves electropolymerization of two monomers, one containing one vinyl group (Ru(bpy)$_2$vpy), the other containing three vinyl groups (Ru(vbpy)$_3$). In this embodiment of the present invention, the degree of cross linking in the final film can be modified from highly cross-linked pure Ru(vbpy)$_3$ to pure Ru(bpy)$_2$vpy which has no cross-linking.

Another preferred embodiment of the present invention involves complexation of ruthenium bis(bipyridine) dichloride, Ru(bpy)$_2$CL$_2$, with poly(vinylpyridine) resulting in Ru(bpy)$_2$(PVP)Cl where PVP represents the binding of one of the pyridine groups of the poly(vinylpyridine) to ruthenium. This redox polymer is then spin-coated or dip-coated onto an electrode from a methanol solution containing 1,10-dibromodecane and the solvent allowed to evaporate. Subsequent heating of the film to 60° C. for 1 hour results in reaction of the 1,10-dibromodecane with the poly(vinylpyridine) to form a cross-linked polymer film.

Another preferred embodiment of the present invention involves the deposition onto an electrode surface by spin-coating or dip-coating a solution containing tetra(4-aminophenyl)porphyrin and poly(ethyleneglycol) diglycidylether. When heated, these two compounds react in a manner similar to an epoxy glue, resulting in a cross-linked redox active film on the electrode surface.

The various types of secondary cells for use in battery systems employing the above-described redox polymer electrodes in accordance with the present invention may be divided into three general classes. In the first class of such systems, the anode of the secondary battery in its charged state includes as its anode-active material a redox polymer charged to its reduced state. This class includes a wide variety of battery systems wherein such anode is employed in combination with various compatible electrolytes and cathodes. The discharging mechanism of such secondary battery involves the electrochemical uncharging of the redox polymer anode to a higher oxidation state. In the discharged state of such a secondary battery, its anode-active material is the redox polymer in uncharged form or which is chargeable to a lower oxidation state. The charging mechanism of such secondary battery involves the electrochemical charging of such chargeable redox polymer to a lower oxidation state.

In the second class of such systems, the cathode of the secondary battery in its charged state includes as its cathode-active material a redox polymer in its oxidized state. This class includes a variety of battery systems wherein such cathode is employed with various compatible electrolytes and anodes. The discharging mechanism of such secondary battery involves the electrochemical uncharging of the redox polymer cathode to a lower oxidation state. In the discharged state of such a secondary battery, its cathodeactive material is the redox polymer in uncharged form or which is chargeable to a higher oxidation state. The charging mechanism of such secondary battery involves the electrochemical charging of such chargeable redox polymer to a higher oxidation state.

In the third class of such systems, both anode and cathode of the secondary battery are comprised of redox polymers. The same redox polymer may be used for both anode and cathode, in which case the redox polymer is oxidized on the cathode and reduced on the anode when the battery is in its charged state. Discharging the battery then leads to the redox polymer returning to the same oxidation state on both anode and cathode. Starting from the discharged state, such a battery can be charged in either polarity, that is, either electrode can be employed as the anode. Alternatively, one redox polymer may be used for the anode and a different redox polymer for the cathode.

The same electrolytes, containing the counterions, and solvents used in other batteries and electrochemical systems are also capable of being used in the present invention.

These secondary batteries may be either initially assembled in a charged state, or initially assembled in an uncharged state, and subsequently converted in situ to such charged state by means of the electrochemical reactions. Depending upon the type of battery system being assembled, precharged polymer may be either optional or required in the initial assembly.

The following examples are provided for illustration, not limitation, and various modifications will be apparent to the skilled artisan. Such modifications are considered to fall within the spirit and scope of the present invention.

EXAMPLE 1

A solution of 0.0039 g of ruthenium tris(vinylbipyridine) hexafluorophosphate in approximately 2 ml of UV Grade acetonitrile (Baxter Corp., Deerfield, Ill.) was prepared. A working electrode comprising a Cypress Systems, Inc. (Lawrence, Kans.) glassy carbon mini electrode with a polyether ether ketone (PEEK) body and a 1.5 mm diameter platinum rod (Johnson Matthey, Ward Hill, Mass.) counter electrode and a silver wire (Johnson Matthey) reference electrode were all suspended in the solution. Potential and scan rate applied to this cell were controlled with a PAR Potentiostat Model 173 (EG&G Princeton Applied Research, Princeton, N.J.) and PAR Universal Programmer Model 175 with data collection handled by LabVIEW from National Instruments (Austin, Tex.) running on a Macintosh IIci (Apple Computer, Inc. Cupertino, Calif.). The potential applied to the working electrode was scanned from 0V to −1.70V at 100 mV/sec until a 32 $\mu$A re-oxidation peak was obtained. This required about ten cycles. This process resulted in the deposition of a polymer film on the surface of the glassy carbon of approximately 2 $\mu$m thickness. Film thickness was determined from (Capacity/F x Area) (Molecular Weight/Density). In this equation F is Faraday's constant and density is assumed to be 1 g/cm$^3$.

The coated glassy carbon electrode, platinum counter electrode and silver reference electrode were suspended in 2 ml of acetonitrile to which recrystallized tetrabutylammonium hexafluorophosphate was added. The coated electrode was cycled between 0.2V and 2.2V at 200 mV/sec. After 2400 cycles, the electrode capacity was 80% of its initial value. Electrode coating and cycling were carried out in an argon atmosphere glove box (Vacuum Atmospheres, Hawthorne, Calif.).

EXAMPLE 2

To the same electropolymerization solution used in Example 1, approximately 1$\mu$l of isoprene (Aldrich Chemical Company, Inc. Milwaukee, Wis.) was added. Electropolymerization was carried out as in Example 1 to produce a pair of electrodes.

One of these electrodes was cycled 2600 times from 0V to 2.2 V and back at 200 mV/sec by which time the electrode capacity had dropped to 83% of its initial value. The electrolyte solution consisted of 2 ml acetonitrile and 0.0358 g of recrystallized tetrabutylammonium hexafluorophosphate. The cell was set up as described in Example 1.

The two coated electrodes were then used together in a cell. The cell was charged to 3.5 V and discharged to 1 V through 2400 cycles by which time the electrode capacity had dropped to 95% of its initial value.

EXAMPLE 3

An electropolymerization solution of 0.0078 g of ruthenium tris(vinylbipyridine) hexafluorophosphate and 0.1697 g of recrystallized tetrabutylammonium hexafluorophosphate in approximately 20 ml of acetonitrile was prepared. High surface area electrodes were made from 1 cm×1 cm×5 cm pieces of 20 pores per inch reticulated glassy carbon (The Electrosynthesis Co., Inc. East Amherst, N.Y.). Silver epoxy (Epoxy Technology Inc., Billerca, Mass.) was used to make electrical contact between the glassy carbon and multi-strand insulated wire. These electrodes were coated by using one as the working electrode and the other as the counter electrode with a silver wire reference electrode in the electropolymerization solution. Starting at 0V the system was scanned between +3V and −3V at 100 mV/sec for 8 cycles. This pair of polymer coated electrodes was suspended in a solution of 0.26 g of recrystallized tetrabutylammonium hexafluorophosphate in 40 ml of acetonitrile. The system was charged to a potential of 3.3V and then discharged through a 10 GigaOhm resistance for 70 minutes. During this time the voltage decayed from 2.9V to 1.36V.

EXAMPLE 4

Poly(ethylene glycol 200 diglycidyl ether) was diluted to 3.1 g/l in methanol. Iron tetra(4-amino-phenyl)porphyrin was dissolved in methanol to a concentration of 5.4 g/l. A coating solution was prepared from 500 $\mu$l of the porphyrin solution and 5 $\mu$l of the diepoxide solution. 1 $\mu$l was applied to a glassy carbon mini electrode, allowed to air dry for a few minutes and then placed in a 60° C. oven for 66 hours. Electrochemistry was performed using two cells linked by a salt bridge. The salt bridge electrolyte solution consisted of tetrabutylammonium chloride in acetonitrile at a concentration of 0.1007 g/ml. The working cell was purged with nitrogen for ten minutes prior to electrochemical cycling. The polymer coated electrode was cycled between 0.0 1V and −1.15V at 50 mV/sec. After 70 cycles, the capacity had dropped to 87% of its initial value.

EXAMPLE 5

A method similar to Example 4 was followed to make a redox polymer consisting of the free base of tetra(4-amino-phenyl)porphyrin. 10 $\mu$l of the diepoxide, 1.1×10$^{-3}$ mol/l in methanol and 160 $\mu$l of porphyrin solution, 0.521×10$^{-3}$ mol/l in methanol were combined. A 1 $\mu$l drop of this solution was applied to a platinum mini electrode and allowed to air dry for a few minutes and then placed in a 60° C. oven for 2 hours. The polymer coated electrode was cycled between 0V and 1.1V at 20 mV/sec.

EXAMPLE 6

PVP-Ru(bpy)$_2$Cl$_2$ was cross linked using 1,10-Dibromodecane. A solution containing 0.0109 g PVP-Ru(bpy)$_2$Cl$_2$ and 0.0062 g of 1,10-Dibromodecane in 5 μl of methanol was prepared. 1 μl of this solution was placed on each of a platinum, gold, and glassy carbon mini electrode, allowed to air dry for a few minutes and then placed in a 60° C. oven for 1 hour. Each of the coated electrodes was used as the working electrode with a platinum counter electrode and silver wire reference electrode.

EXAMPLE 7

This procedure was designed to adjust the amount of cross linking during electropolymerization. An electropolymerization stock solution was prepared by dissolving 3.8 mg Ru(bpy)$_2$(vbpy)2PF$_6$ and 0.5 mg Ru(vbpy)$_3$2PF$_6$ in 200 μl of acetonitrile. Baxter UV grade acetonitrile was refluxed over CaH$_2$ for 20 hours in a nitrogen atmosphere before use and transferred in an inert atmosphere into the helium atmosphere glove box. Electropolymerization onto glassy carbon mini electrodes was performed in an electrochemical cell containing a 1.5 mm diameter platinum rod as counter electrode and a silver wire as reference electrode. The electropolymerization solution was prepared by adding 50 μl of the stock electropolymerization solution to 2 ml of acetonitrile and 0.0222 g tetra ethyl ammonium perchlorate. The working electrode was cycled between 0.01V and −1.70V at 100 mV/sec until the reoxidation current reached 10 μA. About 50 cycles were required to reach this current. The resulting polymer film was determined as described in Example 1 to be about 0.2 μm thick. When used as positive electrodes, the working electrodes were cycled between +0.5V and +2.2V at 500 mV/sec in 2 ml of the stock electrolyte solution. The initial capacity and the capacity after every 500 cycles were determined at lower scan rates, generally 100 mV/sec and slower. After every 1000 cycles the electrolyte solution was replaced. The capacity of these electrodes was 64% of initial after 6600 cycles.

EXAMPLE 8

After preparing electrodes as in Example 7, the electrodes were cycled between −0.5V and −1.6V at 100 mV/sec in 2 ml of stock electrolyte solution. This procedure resulted in electrodes that retained more of their initial capacity than those made without this post-polymerization cycling. Electrodes coated this way were used as either anode or cathode, or as both electrodes in a two electrode configuration.

The same procedure as in Example 7 was used to determine the performance of the polymer films as negative electrodes except that cycling was between −0.5V and −1.6V. Capacity remained constant for the first 6100 cycles and then fell off to 82.6% of initial by 10100 cycles.

In a two electrode configuration one coated electrode served as the working electrode while the other was connected to both the counter and reference leads. Electrochemistry was performed in 2 ml of stock electrolyte solution. The cell was cycled between the discharged state at 1V and the charged state at 3.2V at 500 mV/sec. The initial capacity and the capacity after every 500 cycles were determined. The electrolyte solution was replaced after every 1000 cycles. Capacity fell to 66% of initial after 7000 cycles.

EXAMPLE 9

Ru(vbpy)$_3$ was electropolymerized onto glassy carbon electrodes by cycling between 0.01V and −1.70V at 100 mV/sec for 10 cycles. Five polymer coated glassy carbon electrodes were produced from the same solution. Polymer film thickness was approximately 0.3 μm. A pair of these electrodes was cycled in a two electrode configuration in 2 ml of acetonitrile containing 0.0202 g tetrabutylammonium hexafluorophosphate. The cell was cycled between 1V and 3.25V at 200 mV/sec for 2250 cycles by which time the capacity had fallen to 98% of its initial value.

EXAMPLE 10

A pair of electrodes produced by the method described in Example 8 was used in a secondary battery. The polymer film thickness was about 0.2 μm corresponding to capacity of about $2 \times 10^{-5}$ Coulombs over the electrode area of about 0.8 square millimeters. These electrodes were immersed in 0.3 ml of stock electrolyte solution which is described in Example 7. This cell was charged to 3 volts using a Keithley 236 Source Measure Unit (Keithley Instruments, Inc., Cleveland, Ohio). The Keithley was then used to discharge the battery at 3 nanoAmps. Complete discharge took about 45 minutes. The cell was taken through several charge and discharge cycles. Since the two electrodes were the same material there was no need to distinguish between positive and negative electrodes when charging the cell. This cell was charged by reversing the Keithley output terminals on consecutive cycles. These experiments were conducted in a helium atmosphere glove box.

The foregoing is considered as illustrative only of the principles of the invention. Further, because numerous modifications and changes will readily occur to those skilled in the art, it is not desired to limit the invention to the exact construction and operation shown and described, and accordingly, all suitable modifications and equivalents may be considered to fall within the spirit and scope of the invention as defined by the claims which follow.

What is claimed is:

1. A secondary cell comprising two electrode means, and an electrolyte, wherein at least one of said electrode means comprises a redox polymer material, wherein the redox polymer material changes oxidation state to transfer charge and is selected from the group consisting of: pyridyl or polypyridyl complexes of iron, ruthenium, osmium, chromium, tungsten, or nickel; tetra (4-aminophenyl) porphyrin and poly(ethyleneglycol)diglycidylether; iron tetra (4-aminophenyl)porphyrin and poly(ethyleneglycol) diglycidylether; and epoxy polymer of iron tetra (4-aminophenyl)porphorin; tetra (4-aminophenyl) porphyrin; metal complexes of cyclams, metal complexes of crown ethers and metallocenes.

2. The secondary cell of claim 1, wherein the redox polymer material is selected from the group consisting of: ruthenium trisvinylbipyridine, osmium bisbipyridine dichloride osmium trisvinylbipyridine and ruthenium bisbipyridine dichloride.

3. The secondary cell of claim 1, wherein the redox polymer material is made by electropolymerizing a redox complex.

4. The secondary cell of claim 1, wherein the redox polymer material is made by polymerizing an amine-containing redox complex with a polyepoxide.

5. The secondary cell of claim 1, wherein the redox polymer material is made by reaction of a redox complex bound to poly(vinylpyridine) with an alkyl dihalide.

6. The secondary cell of claim 1, wherein the redox polymer material is made by reaction of a redox complex bound to poly(vinylpyridine) with an aryl dihalide.

7. A secondary cell comprising two electrode means, and an electrolyte, wherein at least one of said electrode means comprises a redox polymer material, wherein the redox polymer material is made from a mixture of polymerizable monomers containing one, two or three vinyl groups.

8. The secondary cell of claim 1, wherein the redox polymer material is deposited onto a high surface area electrode.

9. The secondary cell of claim 8, wherein the high surface area electrode is carbon foam.

10. The secondary cell of claim 1, wherein the redox polymer material is poly(vinylpyridine) complex of ruthenium bis(bipyridine) chloride crosslinked with dibromodecane.

11. The secondary cell of claim 1, wherein the redox polymer material is poly tris(vinylbipyridine) ruthenium.

12. The secondary cell of claim 1, wherein the redox polymer material is copolymer of tris(vinylbipyridine) ruthenium and mono(vinylbipyridine)bis(pyridine) ruthenium.

* * * * *